United States Patent Office 3,479,392
Patented Nov. 18, 1969

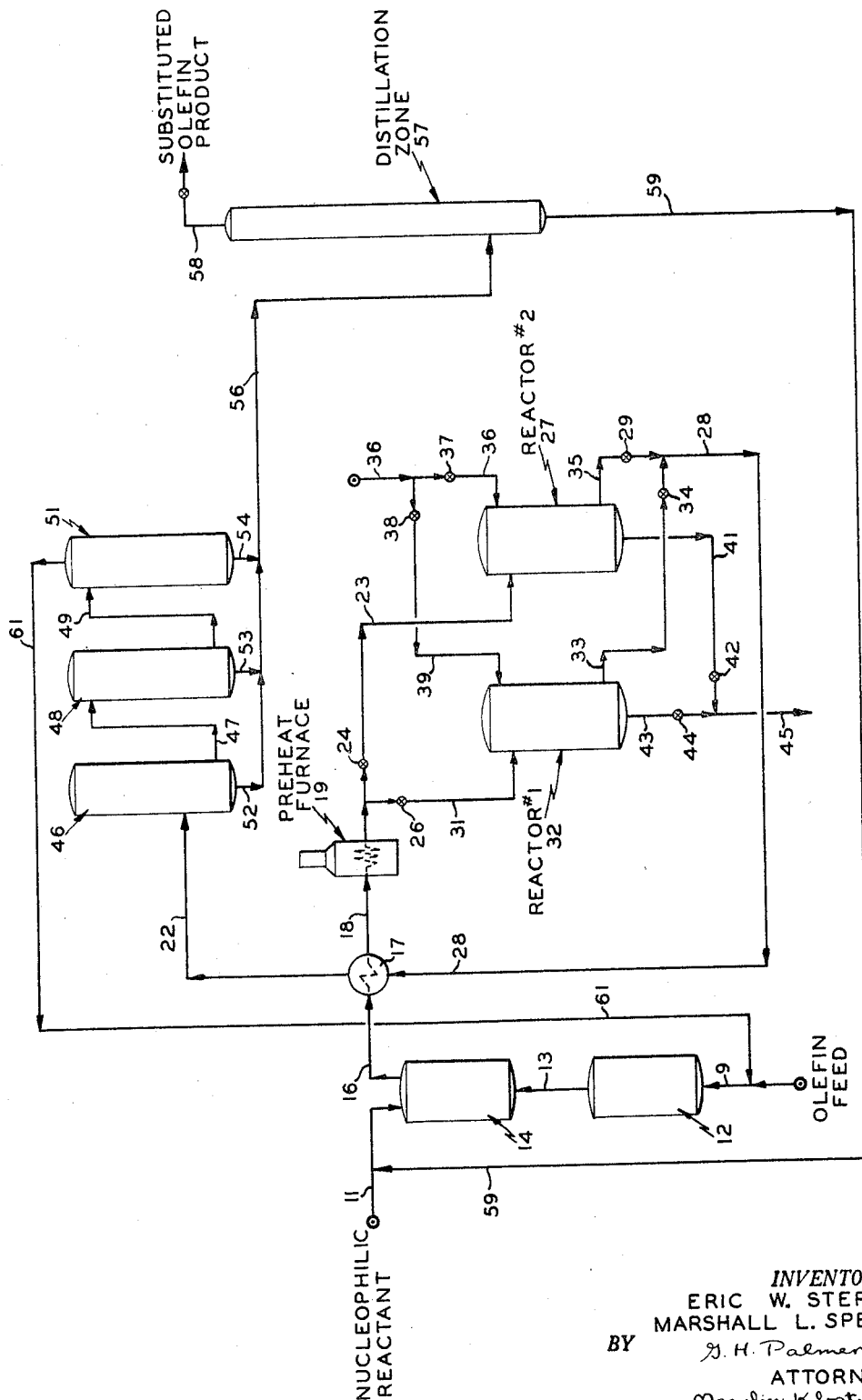

3,479,392
PRODUCTION OF UNSATURATED ETHERS AND ESTERS
Eric W. Stern, East Orange, and Marshall L. Spector, Livingston, N.J., assignors, by mesne assignments, to W. R. Grace & Co., New York, N.Y., a Connecticut corporation
Filed Dec. 23, 1960, Ser. No. 78,111
Int. Cl. C07c 67/04, 41/10, 69/62
U.S. Cl. 260—497                                  8 Claims The present invention relates to an improved process for the production of ethylenically unsaturated compounds. In one aspect the present invention relates to the production of substituted olefins. In another aspect the invention relates to the production of vinyl acetate and other substituted vinyl compounds from ethylene.

Among the more important raw materials employed in industry today are vinyl compounds which are used extensively for the production of polymers, resins, plasticizers, intermediates for the synthesis of pharmaceuticals, adhesives and other valuble products. Thus, for example, vinyl acetate is used chiefly in the preparation of polymers, copolymers, and resins including those derived from its polymer (polyvinyl acetate) such as polyvinyl alcohols and polyvinyl acetals such as polyvinyl acetal and polyvinyl butyral. Vinyl acetate also finds general application as an acetylating agent. Vinyl chloride is another raw material used in the manufacture of valuable resins including polyvinyl chloride resins, and copolymers of vinyl chloride with vinyl acetate or other unsaturated esters.

Generally such vinyl compounds are produced by vinylation reactions which denotes the addition of acids, alcohols, etc., to acetylene to give the corresponding vinyl derivatives such as vinyl esters, vinyl ethers, etc. Thus today, vinyl acetate is produced commercially by passing gaseous acetic acid and acetylene through charcoal impregnated with cadmium or zinc salts at an elevated temperature. In accordance with this type of process, which also is applicable to the production of other vinyl esters, the triple bond of the acetylene is converted to an ethylenic point of unsaturation due to the addition of the acid or other compound containing reactive hydrogen across the triple bond. Although the yields of vinyl derivatives produced from acetylene are satisfactory, there are several drawbacks to such processes. Due to the fact that purification of acetylene is relatively difficult and involves special techniques which add to the cost of the raw material as compared, for example, with ethylene, the cost of the final product is necessarily enhanced. In addition, special techniques and precautions are required in handling acetylene due to its explosive nature. Therefore, a process by which vinyl derivatives may be produced from a source other than acetylene is highly desirable.

Other methods for producing vinyl derivatives involve the use of saturated compounds and the conversion thereof to ethylenically unsaturated products by methods such as dehydrohalogenation. Such processes, however, are not selective and lead either to low yields of desired product or loss of starting material due to side reactions which are relatively difficult to control or avoid.

It is an object of this invention, therefore, to provide a novel and improved method for producing unsaturated compounds.

Another object is to provide a process for producing substituted olefins from a reactant other than acetylene or acetylenic compounds.

Another object is to provide a generally improved and economical method for producing vinyl derivatives.

Another object is to provide a new and improved process for producing vinyl esters such as vinyl acetate, vinyl halides such as vinyl chloride, vinyl amines and other useful vinyl derivatives.

A further object is to provide a process for the production of the above types of compounds from an ethylenically unsaturated compound.

Various other objects and advantages of this invention will become apparent to those skilled in the art from the accompanying description and disclosure.

In accordance with the present invention, substituted olefins are produced by the process which comprises reacting an ethylenically unsaturated compound and a nucleophilic compound in the presence of a Group VIII metal salt under substantially anhydrous conditions. The ethylenically unsaturated reactant contains at least one

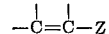

grouping in which Z may be hydrogen or halogen, and the nucleophilic reactant may be represented by the general formula H—A in which H is reactive hydrogen and A is an anion. Under the reaction conditions employed in accordance with the teachings of this invention, the anion (A) replaces the Z group of the olefin, yielding a substituted compound having the group,

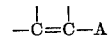

as a product of the process. Thus, it is seen that the indicated point of unsaturation in the olefin reactant does not become saturated by the addition of the nucleophilic compounds (H—A) but is unexpectedly retained due to a substitution reaction.

In order to accomplish the desired production of the substituted olefin, the present reaction is effected in the presence of a compound of a Group VIII metal having an atomic number of at least 44, including palladium, platinum, ruthenium, iridium, rhodium and osmium and mixtures thereof. Suitable salts of these metals which may be used in accordance with the teachings of this invention include the halides, acetates, sulfates, nitrates, cyanides and complex salts. The preferred Group VIII metal salts are the halides, represented by the general formula $MX_n$, in which M is one of the aforesaid Group VIII metals, X is any of the halogens (F, Cl, Br, I), and $n$ is an integer from 2 to 6. The Group VIII metal salt may be unsupported, or it may be used in combination with a support, carrier or diluent, typical examples of which are alumina, silica gel, Celite and Alundum. Typical examples of suitable Group VIII metal compounds are: palladous chloride, palladous bromide, palladous iodide, palladium trifluoride, palladium acetate, platinous chloride, platinous bromide, platinous cyanide, platinum tetrafluoride, platinum tetrachloride, platinum tetrabromide, potassium chloroplatinate, rhodium trichloride, rhodium trisulfate, ruthenium trichloride, ruthenium tribromide, ruthenium disulfate, osmium dichloride, osmium tetrachloride, iridium trichloride, iridium tetrachloride, iridium tribromide and iridium trifluoride. Although any of the Group VIII noble metals may be used, palladium compounds are preferred, the other metal compounds being somewhat less reactive. For convenience, the following discussion is largely made specific to the use of palladium chloride, but it is to be understood that such specific teachings also apply to the use of the other Group VIII metal salts.

The Group VIII metal salt such as palladium chloride may be added to the reaction zone as such, or it may be added as a pre-formed complex with the ethylenically unsaturated reactant. The palladium chloride may also complex with the ethylenically unsaturated compound in situ. Although the exact function of the Group VIII metal compound is not completely understood, it is believed that it activates the carbon-to-carbon double bond of the olefin reactant allowing the reaction to proceed as described herein. Depending upon the ethylenically unsaturated compound employed as a reactant, the palladium chloride may or may not undergo chemical change. As indicated above, the ethylenically unsaturated reactant contains the

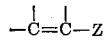

group wherein Z is hydrogen or halogen, the Z group being replaced by the anion (A) of the H—A reactant. It has been found that when the Z group is hydrogen, its replacement with the anion (A) of the nucleophilic reactant is accompanied by the formation of metallic palladium, the overall reaction proceeding as follows:

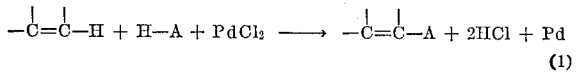

(1)

On the other hand, when the Z group is halogen (X=F, Cl, Br, I), the halogen is also replaced with the anion of the nucleophilic reactant but in this instance the precipitation of metallic palladium is not observed, the reaction proceeding as shown by the following illustrative equation:

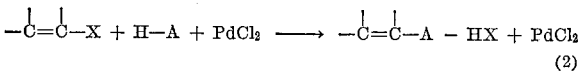

(2)

Although Equation 2 shows that the palladous chloride apparently undergoes no change, the palladous chloride type compound is necessary to achieve the desired substitution reaction.

Thus, Equations 1 and 2 above represent two separate and distinct embodiments of the present invention. In accordance with the one embodiment (Equation 1), the Group VIII metal salt typically represented by palladous chloride, functions as a reactant undergoing chemical change to elemental metal. In accordance with the other embodiment (Equation 2), the Group VIII metal salt functions as a catalyst in the sense that no elemental metal is formed as a product of the process. Therefore, the desired product, the substituted olefin, may be obtained by either route, the choice depending largely upon the availability of the ethylenically unsaturated olefin reactant. Thus, for example, when vinyl acetate is the desired product of reaction, ethylene may be reacted with acetic acid as the nucleophilic reactant in accordance with Equation 1, or vinyl chloride may be reacted with the acetic acid in accordance with Equation 2, or a mixture of ethylene and vinyl chloride may be reacted with the acetic acid to produce vinyl acetate.

The ethylenically unsaturated organic compound which is interacted with the nucleophilic reactant includes substituted and unsubstituted aliphatic acyclic and alicyclic compounds containing from 2 to 200 or more carbon atoms per molecule and at least one aliphatic

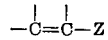

grouping in which Z is hydrogen or halogen (X). The acyclic aliphatic compounds are conveniently represented by the general formula:

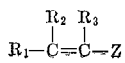

in which the $R_1$, $R_2$ and $R_3$ radicals may be hydrogen; halogen; or organic radicals including substituted and unsubstituted alkyl, cycloalkyl, alkenyl, cycloalkenyl, ethynyl, and aromatically unsaturated radicals such as aryl and aralkyl groups. When the $R_1$, $R_2$ and $R_3$ groups are organic radicals, they may be substituted with various substituents such as halogen, aryl, aryloxy, alkoxyl, nitro, acyl, and acyloxy radicals.

Instead of being bonded to the $R_2$ and $R_3$ radicals, the carbon atoms of the

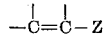

group may be bonded to one or more methylene radicals forming a carbocyclic compound having the general formula:

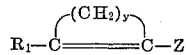

in which $R_1$ and Z are as above defined and y is usually an integer from 1 to 6. The hydrogen atoms of the methylene group or groups of the carbocyclic olefins may be substituted with substituents which may be the same or different from the $R_1$ radical.

It is to be understood that the indicated R radicals may be the same or different, and that the olefin reactant may contain, in addition to the one point of attack, i.e., the

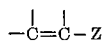

grouping, one or more additional ethylenic carbon-to-carbon double bonds having replaceable halogen or hydrogen attached thereto as in polyolefins, in which case a polysubstituted olefin may be produced.

The preferred olefinic reactant is typically represented by the formula:

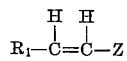

in which $R_1$ is hydrogen, an alkyl radical having from 1 to about 20 carbons atoms, or an aryl radical, and Z is hydrogen or halogen.

Typical examples of suitable olefins which may be employed as reactants in accordance with the present invention are the hydrocarbon olefins such as ethylene, propylene, butene, pentene, hexene, heptene, decene, dodecene, isobutene, isopentene, isooctene, butadiene, isoprene, 2,3-dimethylbutadiene, pentadiene-1,4, cyclopentyl ethylene cyclopentene, cyclohexene, cyclopentadiene, styrene, alpha-methylstyrene, para-ethylstyrene, 2,4-dimethylstyrene, vinyl acetylene, divinyl acetylene, vinyl diacetylene; halogenated olefins such as vinyl chloride, vinylidene chloride, 1,2 - dichloroethylene, trichloroethylene, perchloroethylene, vinyl bromide, 1-bromopropene, 1-bromohexene-1, 2-chloropropene, 1-chloro-2-methyl propene, 2-chloro-3-phenyl-propene, allyl chloride, 1-chloro-1-fluoroethylene, 2-chlorobutadiene, 3,4-dichlorostyrene, 2-chlorobutadiene-1,4, 1-chloro-3 - butene, and other substituted olefins such as, for example, methyl vinyl ether, propyl vinyl ether and vinyl acetate.

The olefin reactant also may be a high molecular weight material such as polymers containing points of ethylenic unsaturation such as polybutadiene, polychloroprene and polyisoprene. Such high molecular weight olefinic materials dispersed in a suitable medium such as benzene, are advantageously reacted with the nucleophilic compound to incorporate reactive sites for further utilization of the polymer or modification of its properties. For example, reaction of such polymers with amines incorporates dye receptor sites at the points of unsaturation; reaction with a carboxylic acid incorporates ester radicals which are hydrolyzable to reactive acid groups for further reaction of the molecule.

The nucleophilic reactant, represented by the general formula H—A, is the source of the A radical or substituent in the desired product of reaction, and may be any compound capable of yielding a negative radical or anion (A) under the process conditions including inorganic and organic compounds. The anion may be alkoxy or aryloxy (—OR), carboxylate (—OCOR), halogen (—X), cyano (—CN), amino (—$NH_2$, —NHR, —NRR), amido (—NHCOR), cyanate (—CNO), isocyanate (—NCO) radicals, carbanions of organometallic compounds ($R^-$), thiocyanate (—CNS), and other sulfur-containing groups such as mercapto (—SR) and sulfhydryl (—HS) radicals. As shown, the anion (A) of the H—A compound is a monovalent radical and is bonded to the H by the indicated atom of oxygen, nitrogen, etc. For example, when the anion is an —OR or —OCOR radical, the anion is bonded to the hydrogen atom (H) by an oxygen atom. Such compounds, therefore, include alcohols, phenols, carboxylic acids, hydrogen halides, hydrogen cyanide, amines or ammonia, cyanic acid, isocyanic acid, organometallic compounds, thiocyanic acid, mercaptans and hydrogen sulfide. The indicated R radical of each of the organic nucleophilic compounds may contain from 1 to 30 carbon atoms or as many as 200 or more carbon atoms, per radical, usually from 1 to about 20 carbon atoms, and may be an alkyl, alkenyl, cycloalkyl, cycloalkenyl or aryl radical which may be unsubstituted or further substituted with any of the above enumerated anions. Typical examples of the organic compounds which may be employed as the nucleophilic compound (H—A) are: saturated primary, secondary and tertiary alcohols of the homologous series, methanol, ethanol, propanol, butanol, pentanol . . . cetyl alcohol, etc.; propanol-2, tertiary-butyl alcohol, decahydronaphthol; aliphatically or aromatically unsaturated alcohols such as allyl alcohol, benzyl alcohol, styrol, cinnamyl alcohol, beta-phenyl-ethyl alcohol, naphthol; terpene alcohols; saturated and unsaturated carboxylic acids such as formic acid, acetic acid, propionic acid, butyric acid, isobutyric acid, oleic acid, hexanoic acid, octanoic acid, lauric acid, acrylic acid, vinyl acetic acid, benzoic acid, cinnamic acid, phenyl acetic acid, methylacetyl salicylic acid, p-methoxybenzoic acid; amines including primary and secondary amines such as methyl amine, ethyl amine, n-propyl amine, butyl amine, octyl amine, dodecyl amine, allyl amine, dimethyl amine, di-n-propyl amine, aniline, diphenyl amine, carbazole; carboxylic acid amides such as acetamide, 5-methyl-2-pyrrolidone and pyrrolidone; and mercaptans of the homologous series methyl, ethyl, propyl, butyl . . . dodecyl mercaptans, etc. As noted above, such compound may contain more than the one anion or any combination of anions, such compounds being typically represented by: sucrose, ethylene glycol, propane diol, 1,3- and 1,4-butanediol, glycerol, malonic acid, adipic acid, salicylic acid, pimelic acid, phthalic acid, terephthalic acid, ethylene diamine, hexamethylene diamine, parachlorobenzoic acid, bisphenol - A, ethylene chlorohydrin, ethylene oxide, propylene oxide, epichlorohydrin, melamine and cyanuric acid. Higher molecular weight compounds containing anionic groups such as starch and other carbohydrates also are suitable nucleophilic reactants, the hydroxyl groups of such compounds interacting with the olefin reactant such as ethylene, thereby incorporating points of unsaturation, through ether linkages, into the molecule.

An illustrative type equation representing the reaction of the presently described process is as follows in which ethylene is used to represent the olefin reactant:

$$CH_2=CH_2+H-A+PdCl_2 \rightarrow$$
$$CH_2=CH-A+Pd+2HCl \quad (3)$$

Thus, when the nucleophilic reactant (H—A) is an alcohol or phenol, or when A is an alkoxy or aryloxy radical (OR), unsaturated ethers are produced as a product of the process according to the following typical equation:

$$CH_2=CH_2+H-OR+PdCl_2 \rightarrow$$
$$CH_2=CH-O-R+2HCl+Pd \quad (4)$$

When the nucleophilic reactant is a carboxylic acid, unsaturated esters of such acid are produced as a product of the process, according to the following equation:

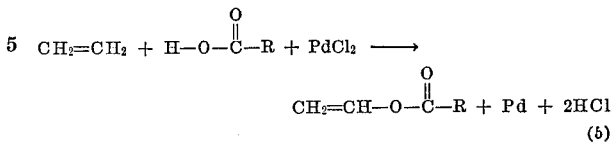
(5)

When the nucleophilic compound is an amine, the basic reaction leads to the production of unsaturated amines as follows:

$$CH_2=CH_2+H-NHR+PdCl_2 \rightarrow$$
$$CH_2=CH-NHR+2HCl+Pd \quad (6)$$

$$CH_2=CH_2+H-NR_2+PdCl_2 \rightarrow$$
$$CH_2=CH-N(R)_2+2HCl+Pd \quad (7)$$

When the nucleophilic compound is an inorganic compound such as ammonia, hydrogen halide, hydrogen cyanide, the reactions proceed as follows, respectively:

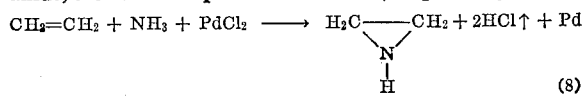
(8)

$$CH_2=CH_2+HX+PdCl_2 \rightarrow$$
$$CH_2=CH-X+2HCl+Pd \quad (9)$$

$$CH_2=CH_2+HCN+PdCl_2 \rightarrow$$
$$CH_2=CH-CN+2HCl+Pd \quad (10)$$

It is to be understood that the R radicals in each of the above equations may be organic radicals as previously described, and X may be any of the halogens.

The substituted vinyl compounds produced in accordance with the above equations are also produced when halogen is bonded to one of the carbon atoms of the double bond. Thus, when vinyl chloride is used in the above reactions in place of ethylene, Equation 3 above, for example, proceeds as follows:

$$CH_2=CHCl+H-A+PdCl_2 \rightarrow CH_2=CH-A$$
$$+HCl+PdCl_2 \quad (11)$$

Comparing the result obtained in Equation 3 and 11, it is seen that when the Z group of the olefin is hydrogen, palladium metal precipitates, whereas when the Z radical is halogen, no palladium precipitates. It is postulated without limiting the scope of this invention that in the latter type reaction, if the palladium chloride does undergo chemical reaction, it is regenerated in situ during the course of the reaction.

As further illustrative of the scope of the present invention, the following equation illustrates the reaction between the olefinic reactant typically represented by ethylene, and polyfunctional nucleophilic compounds typically illustrated by adipic acid:

$$2CH_2=CH_2+HOOC-(CH_2)_4-COOH+2PdCl_2 \rightarrow CH_2=CH-OCO(CH_2)_4-COOCH=CH_2+4HCl+2Pd \quad (12)$$

Another valuable vinyl compound particularly useful for the manufacture of thermoplastic resins of good electrical properties is N-vinyl carbazole which also may be produced in accordance with the teachings of this invention, as shown in the following equation:

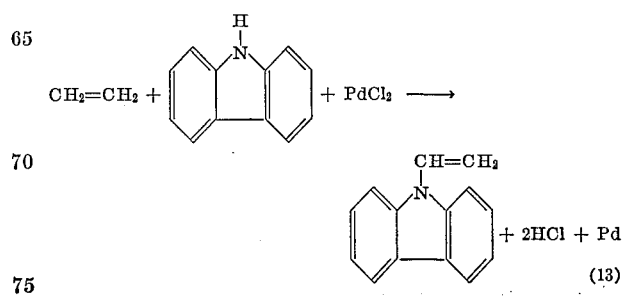
(13)

Similarly 1-vinyl-2-pyrrolidone may be produced by reacting ethylene with pyrrolidone as follows:

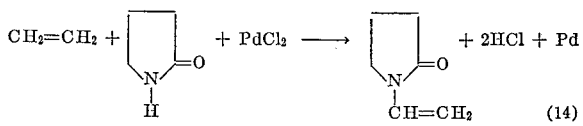 (14)

From the above, it is apparent that by the process of this invention a general vinylation reaction is provided by which valuable vinyl derivatives are produced from ethylenically unsaturated compounds.

The process of the present invention is conducted under substantially anhydrous conditions and may be conducted in the liquid or vapor phase. The temperature of reaction may vary over a relatively wide range of temperature and pressure conditions without departing from the scope of this invention. Generally speaking, the temperature of reaction will be above the freezing point of the particular reaction mixture and below the decomposition temperature of the reactants or product. Thus, the reaction temperature may range between about −15° F. and about 400° F., more usually between a temperature from room temperature (70° F.) to about 300° F. The pressure may also vary over relatively wide ranges and may be above atmospheric, atmospheric, or below atmospheric pressure. For example, within the above temperature ranges the pressure may be between about 0 and about 10,000 pounds per square inch gauge or more. The relative concentration of olefin and nucleophilic reactants and Group VIII metal salt may vary over relatively wide ranges without departing from the scope of this invention. Generally speaking, the greater the ratio of Group VIII metal salt to olefin reactant, the faster the rate of reaction. With respect to the relative concentration of olefin and nucleophilic compound, stoichiometric quantities may be used or an excess of either reactant may be present, the maximum conversion under any given set of conditions being controlled largely by the reactant present in the lesser amount.

As shown in the above equations, the hydrogen of the nucleophilic compound (H—A) reacts with either the halogen released by the Group VIII metal salt or by the halo-olefin reactant, when used, to form hydrogen halide. If desired, therefore, a hydrogen halide acceptor may be employed. Since the process is effected under anhydrous conditions, the hydrogen halide acceptor, when used, is one which does not form water upon neutralization with the hydrogen halide by-product. Thus, suitable and typical hydrogen halide acceptors are the phosphates including the alkali metal or alkaline earth metal hydrogen phosphates such as sodium dihydrogen phosphate, sodium monohydrogen phosphate, and ammonium phosphates. When the nucleophilic compound is a carboxylic acid such as acetic acid, the hydrogen halide acceptor may be metal carboxylates such as sodium acetate which, upon reaction with the hydrogen halide, yield metal halide and carboxylic acid reactant.

The process may be carried out in batchwise or continuous systems without departing from the scope of this invention. The reaction may be effected in the presence of liquid diluents or solvents which may be non-polar or polar and include saturated hydrocarbons such as isooctane, cyclohexane, pentane, etc.; aromatics such as benzene, xylene or toluene; ethers such as ethyl ether, diphenyl ether, tetrahydrofuran, dioxane, and dimethylformamide, in which the reactants are dissolved or dispersed by mechanical agitation or other means.

In the reactions in which elemental metal is formed, the Group VIII metal salt may be regenerated and reused in the reaction. One method of regeneration involves reacting the metal with hydrogen halide and oxygen at an elevated temperature of between about 80 and about 500° F., usually between about 300 and about 400° F. Thus, when palladium chloride is employed as the Group VIII metal salt, for example, it may be regenerated by reacting the palladium metal with hydrogen halide and oxygen or an oxygen-containing gas including air, in accordance with the following equation:

 (15)

The water vapor is driven off as it forms and the metal salt may be heated further, if necessary, to remove any traces of water before the salt is reused. The source of the hydrogen halide employed in the regeneration step may be any extraneous source or may be the hydrogen halide produced as a by-product of the present reaction, when necessary, utilizing hydrogen halide make-up from an external source. Another method of effecting regeneration of the Group VIII metal salt involves reacting the noble metal with compounds of metals which can exist in more than one oxidation state, more particularly, compounds of polyvalent metals which are readily reduced to a lower valence state. Typical examples of compounds which may be reacted with the elemental Group VIII metal are compounds of copper, mercury, cerium, tantalum, tin, lead, titanium, vanadium, antimony, chromium, molybdenum, uranium, manganese, iron, cobalt, nickel, osmium, etc. Thus, for example, palladous chloride may be regenerated from palladium by interacting the palladium with chlorides of such metals of which cupric chloride and ferric chloride are preferred. Thus, when palladium is interacted with cupric chloride, the reaction proceeds as follows:

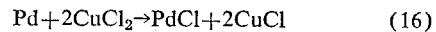 (16)

This reaction may be conducted in either the dry state or in solution. When this method is carried out in aqueous solution, the reaction is preferably carried out at least above the boiling point of water in order to drive off the water, subjecting the palladous chloride to further drying to remove all traces of water before being reused in the process of this invention. Another method of regenerating the Group VIII metal salt such as the metal halides is to react the metal with halogen at an elevated temperature.

In accordance with one embodiment of this invention, the process and regeneration step may be carried out simultaneously employing at least two reactors. In accordance with this embodiment, the reaction between the olefinic reactant and nucleophilic compound in the presence of the Group VIII metal salt is effected in one reactor and when ethylene is employed, palladium deposits as shown in Equation 1 above. The hydrogen halide evolved is either removed from the reactor, or, when a hydrogen halide acceptor such as an alkali metal phosphate is used, it combines therewith. At any suitable time such as when it appears that the Group VIII metal salt has been substantially converted to the metal, the flow of reactants to this reactor is stopped and the reactants passed to a second reactor containing the Group VIII metal salt. The Group VIII metal in the first reactor is now treated with hydrogen halide and oxygen to regenerate the salt after which the reactants may be passed therethrough once again. By so conducting the process in this manner, a continuous and regenerative process is provided.

For a further understanding of this embodiment of the present invention, reference is had to the accompanying drawing, the description of which, for convenience, is specific to the reaction of ethylene and acetic acid in the vapor phase using palladium chloride to produce vinyl acetate as a product of the process.

As shown in the drawing, ethylene is passed along line 9 through drier 12 where any water is substantially removed by conventional methods and is then passed into vaporizer 14 along line 13 where it is admixed with acetic acid introduced thereto by means of line 11. The vaporized mixture is then passed along line 16 through heat exchanger 17 where heat is picked up from a product stream passing through line 28. The mixture is then conducted along line 18 into preheat furnace 19 where it is heated to a temperature between about 150 and about 250° F.

(e.g., about 200° F.) at a pressure between about 5 and about 100 p.s.i.g. (e.g., about 20 p.s.i.g.). The reactants are passed into reactor 27 by means of line 23, opening valve 24 and closing valve 26. Reactor 27 contains palladium chloride and is maintained at a temperature between about 150 and about 250° F. (e.g., about 200° F.) and a pressure between about 5 and about 100 p.s.i.g. (e.g., about 20 p.s.i.g.). The reactants are passed through reactor 27, removing vinyl acetate product and any unreacted ethylene or acetic acid through line 35 and then into line 28. When substantially all of the palladium chloride has been converted to palladium or at any desired point before such time, valve 24 on line 23 is closed and valve 26 on line 31 is opened to allow the ethylene-acetic acid mixture to pass through line 31 into reactor 32 which also contains palladium chloride and is maintained under substantially the same conditions as reactor 27. While the reaction is thus proceeding in reactor 32, palladium chloride is regenerated in reactor 27 by introducing oxygen and hydrogen chloride thereto along line 36 having valve 37 thereon. When reactor 27 is thus being used as the regeneration zone, it is maintained at a temperature between 300 and about 400° F. (e.g., about 375° F.) and a pressure between about 5 and about 100 p.s.i.g. (e.g., about 20 p.s.i.g.). The water vapor produced as a result of this reaction, as well as unconsumed oxygen and hydrogen chloride gases, is allowed to pass from zone 27 by means of line 41 having valve 42 thereon and exits from the system by means of line 45. The gases may then be passed through conventional drying apparatus and the dried gases recycled for further regeneration. When it becomes necessary to regenerate the palladium chloride in reactor 32, the same regenerative procedure described above may be effected by cutting off the flow of reactants thereto by closing valve 26 and passing the oxygen-hydrogen chloride mixture along line 39 by opening valve 38, removing water vapor and gases from reactor 32 by means of line 43 having valve 44 thereon, exiting from the system by means of line 45.

When the reaction between ethylene and acetic acid is being conducted in either or both of reactors 27 and 32, vinyl acetate product is removed therefrom by means of lines 35 and 33, respectively, and carried along line 28 through heat exchanger 17 and line 22 to a conventional condenser system represented by condensers 46, 48 and 51, interconnected by lines 47 and 49, distillate from each being removed by means of lines 52, 53 and 54, respectively, into line 56 by means of which the crude vinyl acetate product is carried to fractional distillation zone 57. Overhead, comprising unreacted ethylene, is removed from the condenser system by means of line 61 and is recycled for further reaction to drier 12. In zone 57, vinyl acetate product is removed as overhead by means of line 58 and unreacted acetic acid is removed as bottoms by means of line 59 and is recycled to vaporizer 14.

It is to be understood that various modifications and embodiments of the method illustrated in the drawing may become obvious to those skilled in the art without departing from the scope of this invention. For example, more than the two reactors illustrated in the drawing may be employed and any number of such reactors may be used simultaneously to effect the primary reaction and any number may be simultaneously operated as regeneration zones without departing from the scope of this invention.

It is to be understood that the choice of temperature of reaction, contact time, molar quantities of reactants and Group VIII metal salts to be preferred in any instance will depend upon the starting material employed and the result desired, and that the procedure employed for the isolation and purification of desired product will depend upon the physical nature and activity of the products. For example, in accordance with the teachings of this invention, ethylene reacts with alcohols to produce vinyl ethers. In order to maintain the yield of the vinyl ether product at relatively high levels, the side reaction of the reactive ether product with any excess alcohol which may be present, is suppressed by separating the vinyl ether product from the reaction mixture as it is formed. Such side reactions are also avoided by conducting the reaction in dilute phase. Although the theory and mechanism of reaction is believed to be correct, other theories may explain the reaction of the present invention, and the theories advanced herein are not to be construed as an unnecessary limitation on the invention.

The following examples are offered as a further understanding of the present invention and are not to be construed as necessarily limiting thereto. In each of the following examples, the manipulative steps and reactions were performed under substantially anhydrous conditions, using anhydrous reactants.

EXAMPLE 1

3.56 grams (0.02 mole) of palladous chloride and 11.36 grams (0.08 mole) of disodium hydrogen phosphate ($Na_2HPO_4$) were charged to a clean, dry glass reaction vessel having a capacity of 12 ounces. The vessel was sealed with a neoprene gasket and a two-holed cap attached to a vacuum line via a hypodermic needle and a Luer Loc valve. The vessel was evacuated, heated to 375° F., maintained at this temperature for 2–4 days under vacuum, and was then cooled to room temperature and charged with 50 cc. of isooctane (previously distilled and dried over lithium aluminum hydride) added from a hypodermic syringe. The vessel was then flushed with C.P. ethylene and pressured to a final gauge pressure of about 710 mm. with shaking (about 2 atmospheres of ethylene were added). The reaction vessel was then charged with 3.6 cc. of glacial acetic acid (3.76 grams, 0.063 mole), which had been redistilled and stirred over a molecular sieve, the water content being 0.023 percent as determined by Karl Fischer analysis. The reaction mixture was shaken at room temperature for 120 hours during the first 72 hours of which a substantially black color was observed, indicating the precipitation of palladium. The solids were allowed to settle and the liquid layer was analyzed by mass syectrometer. Based on mass spectrometer analysis, 0.0044 mole of vinyl acetate were produced. The yield on the basis of palladous chloride was 22.2 mol percent.

EXAMPLE 2

In this example, the same procedure as described in Example 1 above was used except that vinyl chloride was reacted with the acetic acid instead of ethylene. Thus, the reaction vessel was charged with the same amount of palladous chloride, disodium hydrogen phosphate and isooctane, and was pressured to a final pressure with vinyl chloride to 720 mm. gauge, followed by the addition of the same amount of acetic acid as employed in Example 1. The reaction mixture was then shaken at room temperature for 48 hours. No change in color was observed. Based on mass spectrometer analysis of a sample of the liquid product, 0.0052 mole of vinyl acetate were obtained. The yield of vinyl acetate on the basis of palladous chloride was 26.6 mol percent.

EXAMPLE 3

The same general procedure as described in Example 1 above was used, except that isopropyl alcohol was used as the nucleophilic compound instead of acetic acid. Thus, the reaction vessel was charged with the same amount of palladous chloride, disodium hydrogen phosphate and isooctane, and was then pressured to a final pressure of about 1 atmosphere gauge with C.P. grade ethylene. The vessel was then charged with 3.1 cc. (0.04 mol) of isopropyl alcohol added in 3 aliquots at one-half hour intervals. The isopropyl alcohol, which had been previously distilled from barium oxide and stirred under nitrogen over anhydrous magnesium sulfate, had a water content of 0.28 percent as determined by Karl Fischer analysis.

The mixture was shaken overnight, during which time it turned black, indicating the precipitation of palladium. Vinyl isopropyl ether was formed as a product of the reaction.

EXAMPLE 4

The procedure followed in this example was the same as that employed in Example 1 above, except that butadiene was used in place of ethylene. Thus, the reaction vessel was charged with the same amount of palladous chloride, disodium hydrogen phosphate and isooctane, and pressured to a final pressure of 737 mm. gauge with butadiene. Glacial acetic acid (3.6 cc.) was then added, and the reaction mixture shaken at room temperature for 168 hours. The reaction mixture was then heated at 150° F. for 24 hours, during which period a black coloration developed, indicating precipitation of palladium. The liquid phase was analyzed by mass spectrometer, which analysis showed the presence of butadiene monoacetate.

EXAMPLE 5

The same general procedure of Example 1 above was followed, except that propylene was used as the olefin instead of ethylene. Thus, the reaction vessel was charged with the same amount of palladous chloride, disodium hydrogen phosphate and isooctane as used in Example 1, pressured to a final pressure of 743 mm. gauge with propylene, and then charged with 3.6 cc. of glacial acetic acid. The reaction mixture was then shaken at room temperature for 118 hours during which time the reaction mixture turned black as the palladium precipitated. The solids were allowed to settle and the liquid layer was analyzed by mass spectrometer. Based on the mass spectrometer analysis, it was found that 0.00732 mol of isopropenyl acetate was obtained, the yield on the basis of palladous chloride being 36.6 mol percent.

In the following Examples 6, 7 and 8, the indicated nucleaphilic compound was reacted with preformed complex of ethylene and palladous chloride.

EXAMPLE 6

A mixture of 15 grams of palladous chloride and 220 cc. of benzonitrile was heated under reflux until a dark red solution was obtained, after which the hot solution was filtered and the filtrate cooled on an ice bath forming an orange precipitate immediately. The precipitate was collected on a vacuum filter, washed by decantation with six 50 ml. portions of n-pentane, filtered again and finally dried in a vacuum desiccator. The palladous chloride-benzonitrile complex so prepared was placed in a 1-liter flask and 500 ml. of benzene (previously dried over lithium aluminum hydride) were added thereto. The mixture was agitated, the solution filtered, and the clear filtrate treated with ethylene until precipitation of the ethylene-palladous chloride complex was complete. The solid complex was then collected on a suction filter, washed several times by decantation with normal pentane (previously dried over lithium aluminum hydride), collected on a suction filter, washed with additional normal pentane, and dried. A baffled, round-bottom flask, fitted with a stirrer and liquid inlet and gas outlet, was charged with 0.04 mol of the palladous chloride-ethylene complex thus prepared, and 0.32 mol of vacuum-dried disodium hydrogen phosphate. There were then added 500 cc. of isooctane, previously distilled and dried over lithium aluminum hydride. The reaction mixture was stirred and 0.0385 mol of glacial acetic acid, which had previously been redistilled and stirred over a molecular sieve, was added to the above mixture. The mixture was stirred during addition of the acetic acid and the stirring was continued overnight at room temperature. The liquid product was then separated from the solids by distillation at room temperature in vacuo, collecting the liquid product at liquid nitrogen temperature. A sample was then analyzed by mass spectrometer analysis and on the basis of that analysis it was found that 0.0012 mol of vinyl acetate or 3.2 mol percent, on the basis of the palladous chloride-ethylene complex, was produced.

EXAMPLE 7

The procedure of Example 6 was repeated using isopropyl alcohol as the nucleophilic compound in place of acetic acid. Thus, 0.04 mol of isopropyl alcohol was added to the mixture of palladous chloride-ethylene complex (0.04 mol) and vacuum dried disodium hydrogen phosphate (0.32 mol) over a period of 3 hours and 10 minutes with stirring at 5° C. The mixture was stirred for another hour and was then stored at 0° to 5° C. overnight without stirring. The liquid product was collected as described in Example 6 above and a sample was analyzed by mass spectrometer. Vinyl isoproply ether was produced as a product of the reaction

EXAMPLE 8

The procedure of Example 6 was repeated, except that 0.0039 mol of palladous chloride-ethylene complex and 0.0039 mol of isopropyl alcohol were employed, stirring the reaction mixture at room temperature overnight. Vinyl isopropyl ether was produced as a product of the reaction.

The following Example 9 illustrates the reaction between the olefin an nucleophilic compound in the vapor phase over palladous chloride.

EXAMPLE 9

This run was conducted in a vertical atmospheric pressure flow reactor heated by means of a nichrome wire, the temperature being controlled by a Wheelco regulator to plus or minus 5° F. The reactor was loosely packed with a mixture of 16.6 grams of palladous chloride and 66.5 grams of disodium hydrogen phosphate which had been thoroughly mixed with 32.6 grams of ⅛" glass helices. The reactor was charged with a mixture of ethylene and acetic acid by passing the ethylene through a saturator filled with acetic acid. The ethylene flow was gauged through a predictability flow meter and the line from the saturator connecting it with the reactor was heated to a temperature 8–10 degrees above the temperature of the saturator to prevent condensation of acetic acid passing to the reactor. The saturator was kept at a predetermined temperature by a control bath. Prior to the start of the run, the column of palladous chloride-disodium hydrogen phosphate mixture in the reactor was heated at 375° F. under a flow of nitrogen overnight to remove any water which may have been present. All the glassware was then flamed and the saturator charged with 20 cc. of glacial acetic acid, previously dried with acetic anhydride. The column temperature was then adjusted to 200° F. A 15-minute pre-run was made on the column with ethylene, by-passing the saturator. The run was then started, passing the ethylene through the saturator which was maintained at a temperature of 140° F., and introducing the ethylene-acetic acid mixture into the reactor which was maintained at a reaction temperature of 200° F. The flow rate of ethylene was 26.2 cc. per minute and was maintained for 5½ hours, after which time 3.25 grams of liquid product was collected in a water-cooled trap, followed by two Dry Ice-cooled traps. The product was analyzed by mass spectrometer, the analysis showing the presence of 24 mol percent vinyl acetate, 5 mol percent of ethylidene diacetate, the remainder being substantially all unreacted acetic acid. The reactor column had darkened during the course of the run, indicating formation of palladium metal.

After completion of this vapor phase run, the reactor column was flushed with nitrogen overnight at 200° F. The gas flow was then changed to oxygen (about 50 cc. per minute) and the temperature of the column raised to 375° F. Oxygen flow was continued under these conditions until no more water was evolved from the downstream end of the column or for about another 48 hours. The column, which had turned black during the reaction between the ethylene and acetic acid indicating the precipitation of elemental mixture, was no longer black, indicating the re-conversion of the elemental metal to palladous chloride. That the column was still active was demonstrated by repeating the vapor phase reaction between ethylene and acetic acid to produce vinyl acetate. It is postulated without limiting the scope of this invention that the hydrogen chloride evolved during the reaction between the ethylene, acetic acid and palladous chloride reacts with the disodium hydrogen phosphate at the 200° F. reaction temperature to yield sodium chloride and phosphoric acid, the latter two compounds interacting at the higher temperature of regeneration (375° F.) to regenerate hydrogen chloride and disodium hydrogen phosphate, the hydrogen chloride so released reacting with the elemental palladium an doxygen to regenerate the palladous chloride and liberating water according to the following equations:

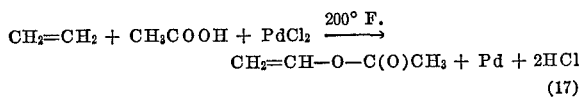

(17)

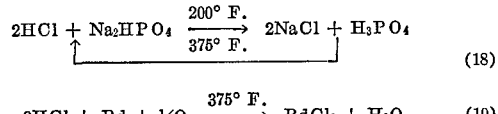

(18)

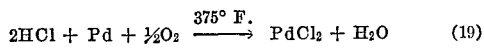

(19)

It is noted that, although the regeneration of the palladous chloride may be effected without the addition of hydrogen chloride from an extraneous source, it has been found that the addition of a small amount of hydrogen chloride gas from an external source may also be used and is preferred practice. Thus, in a second regeneration of the palladous chloride, a small amount of hydrogen chloride gas was passed concurrently with the oxygen gas through the reactor column for the first two hours of the regeneration cycle. It was found that in this case the activity of the column, as evidenced by vinyl acetate production, was restored to a greater extent than when no extraneous hydrogen chloride was added.

Other vinyl derivatives may similarly be produced by the reaction of an ethylenically unsaturated compound having a replaceable hydrogen or halogen bonded to at least one of the carbon atoms of the ethylenic double bond, and the nucleophilic reactant or compound having reactive hydrogen, in the presence of the Group VIII metal salts such as palladium chloride. Similar reactions of ethylene, for example, and other nucleophilic compounds may be prepared in accordance with the foregoing description and specific examples. For example, in addition to vinyl acetate, other vinyl esters which may be produced by interacting ethylene and the appropriate acid in the presence of palladous chloride are: vinyl acrylate, vinyl butyrate, vinyl caprylate, vinyl caproate, vinyl crotonate, vinyl diethyl acetate, vinyl formate, vinyl isobutyrate, vinyl lactate, vinyl laurate, vinyl linoleate, vinyl methoxyacetate, vinyl methacrylate, vinyl abietate, divinyl adipate, vinyl benzoate, vinyl acetylsalicylate, vinyl o-chlorobenzoate, vinyl p-chlorobenzoate, vinyl campholate, vinyl p-methoxybenzoate, vinyl monochloroacetate, vinyl myricate, 1-vinyl naphthoate, 2-vinyl naphthoate, vinyl octylphthalate, vinyl oleate, vinyl palmitate, vinyl phenylacetate, vinyl p-phenylbenzoate, vinyl propionate, vinyl salicylate, vinyl stearate, vinyl trimethylacetate, vinyl 3,5,5-trimethylhexanoate, vinyl thiolacetate, vinyl m-toluate, vinyl p-toluate, and vinyl valerate. In addition to the vinyl derivatives, other unsaturated esters are produced by the process of this invention such as the isopropenyl, butenyl, etc., derivatives of the above.

It is to be understood that when the nucleophilic reagent itself contains the

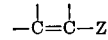

grouping which is common to each of the olefinic reactants, it may function as both the nucleophilic compound (H—A) and olefin reactant and react with itself. This aspect of the present invention is illustrated, for example, by the following interaction of vinyl acetic acid with itself in the presence of palladous chloride:

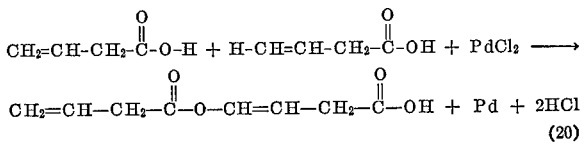

(20)

Although the invention has been described with relation to specific conditions and operating techniques, various modifications and alterations may become apparent to those skilled in the art without departing from the scope of this invention.

Having described our invention, we claim:

1. A process which comprises reacting ethylene and acetic acid in the presence of palladium chloride and disodium hydrogen phosphate under substantially anhydrous conditions to produce vinyl acetate.

2. A process which comprises reacting an unsaturated compound having at least one aliphatic

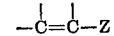

group in which Z is selected from the group consisting of hydrogen and halogen and in which the remainder of the molecule consists of up to twenty carbon atoms and hydrogen, and acetic acid in the presence of palladium chloride and disodium hydrogen phosphate under substantially anhydrous conditions to produce an ethylenically unsaturated ester.

3. A process which comprises reacting ethylene and isopropanol in the presence of palladium chloride and disodium hydrogen phosphate under substantially anhydrous conditions to produce vinyl isopropyl ether as a product of the process.

4. A process which comprises reacting a hydrocarbon olefin having up to 22 carbon atoms with isopropanol under substantially anhydrous conditions in the presence of a palladium halide and disodium hydrogen phosphate to produce an ethylenically unsaturated ether.

5. A process which comprises reacting a hydrocarbon olefin having up to 22 carbon atoms with an alcohol having the formula R—OH in which R is a hydrocarbon radical containing from 1 to about 20 carbon atoms under substantially anhydrous conditions in the presence of a palladium halide and disodium hydrogen phosphate to produce an ethylenically unsaturated ether.

6. A process which comprises reacting a hydrocarbon olefin having up to 22 carbon atoms with an alcohol having the formula R—OH in which R is a hydrocarbon radical containing from 1 to about 20 carbon atoms under substantially anhydrous conditions in the presence of a palladium halide and a hydrogen halide acceptor.

7. A process which comprises reacting a hydrocarbon olefin having up to 22 carbon atoms with an alcohol having the formula R—OH in which R is a hydrocarbon radical containing from 1 to about 20 carbon atoms under substantially anhydrous conditions in the presence of a palladium salt.

8. A process which comprises reacting ethylene and isopropyl alcohol in the presence of palladium chloride under substantially anhydrous conditions to produce vinyl isopropyl ether as a product of the process.

(References on following page)

References Cited

UNITED STATES PATENTS

| | | | |
|---|---|---|---|
| 1,951,747 | 3/1934 | Brezinski | 260—497 |
| 2,198,046 | 4/1940 | Vierling | 260—497 |
| 2,428,590 | 10/1947 | Shokal et al. | 260—497 |
| 2,467,373 | 4/1949 | Dutcher et al. | 260—465.9 |
| 2,739,169 | 3/1950 | Hagemeyer | 260—497 |

FOREIGN PATENTS

| | | |
|---|---|---|
| 137,511 | 4/1960 | U.S.S.R. |

OTHER REFERENCES

Smidt, Angew. Chem., vol. 71, 1959, pp. 176–182.

Stern et al., Chem. Soc. Proc., October 1961, p. 370.

Moiseev et al., Dokalady Akademii Nauk, vol. 133, No. 2, pp. 377–380 (1960).

LORRAINE A. WEINBERGER, Primary Examiner

V. GARNER, Assistant Examiner

U.S. Cl. X.R.

260—210, 233.3, 248, 348, 631.5, 315, 249.6, 491, 468.5, 239; 252—415, 416; 260—611, 612, 614, 486, 484, 485, 476, 487, 475, 469, 410.9, 473, 474, 609, 576, 578, 583, 561, 465.3, 465.9, 455, 454, 453, 326.5